(12) United States Patent
Unruh

(10) Patent No.: US 7,380,724 B2
(45) Date of Patent: Jun. 3, 2008

(54) ENTERING TEXT INTO AN ELECTRONIC COMMUNICATION DEVICE

(75) Inventor: Erland Unruh, Malmo (SE)

(73) Assignee: Sony Ericsson Mobile Communications AB, Lund (SE)

( * ) Notice: Subject to any disclaimer, the term of this patent is extended or adjusted under 35 U.S.C. 154(b) by 217 days.

(21) Appl. No.: 10/519,522

(22) PCT Filed: Jun. 11, 2003

(86) PCT No.: PCT/EP03/06206

§ 371 (c)(1),
(2), (4) Date: Aug. 10, 2005

(87) PCT Pub. No.: WO2004/003721

PCT Pub. Date: Jan. 8, 2004

(65) Prior Publication Data

US 2006/0163337 A1 Jul. 27, 2006

Related U.S. Application Data

(60) Provisional application No. 60/393,905, filed on Jul. 3, 2002.

(30) Foreign Application Priority Data

Jul. 1, 2002 (EP) .................................. 02388043

(51) Int. Cl.
*G06K 7/10* (2006.01)
(52) U.S. Cl. .................................. 235/472.01; 235/375
(58) Field of Classification Search .................... 704/7; 715/534, 816; 707/3, 6; 235/375, 472.01
See application file for complete search history.

(56) References Cited

U.S. PATENT DOCUMENTS

| | | | |
|---|---|---|---|
| 6,150,962 A | 11/2000 | Rossmann | 341/22 |
| 6,204,848 B1 | 3/2001 | Nowlan et al. | 345/352 |
| 6,286,064 B1* | 9/2001 | King et al. | 710/67 |
| 6,307,549 B1 | 10/2001 | King et al. | 345/352 |

(Continued)

OTHER PUBLICATIONS

"Nokia 3210 Users Guide" pp. 39-41, 1999.
International Search Report for PCT/EP03/006206 (WO 2004/003721 A3).

(Continued)

*Primary Examiner*—Karl D. Frech
(74) *Attorney, Agent, or Firm*—Myers Bigel Sibley & Sajovec

(57) ABSTRACT

In entering text into an electronic device with a keypad having a number of keys, each key represents a plurality of characters. A character is entered by the corresponding key and selected among the plurality of characters by pressing the key a number of times corresponding to the character. To each key is attached, in addition to the plurality of characters, a further, ambiguous character representing any one of the plurality of characters. A key sequence is activated such that an ambiguous character sequence comprising at least one ambiguous character is generated. Possible non-ambiguous character sequences corresponding to the ambiguous character sequence are generated and compared with a vocabulary stored in a memory and comprising character sequences representing words occurring in a given language. Those possible character sequences that match character sequences in the vocabulary are pre-selected. One of the pre-selected character sequences is selected and entered into the device.

10 Claims, 3 Drawing Sheets

U.S. PATENT DOCUMENTS

2002/0196163 A1 12/2002 Bradford et al. ............... 341/22
2003/0201982 A1* 10/2003 Iesaka ........................ 345/168
2005/0283358 A1* 12/2005 Stephanick et al. ............ 704/7

OTHER PUBLICATIONS

International Preliminary Examination Report for PCT/EP03/006206.

* cited by examiner

ENTERING TEXT INTO AN ELECTRONIC COMMUNICATION DEVICE

RELATED APPLICATIONS

The present application is a 35 U.S.C. §371 national phase application of PCT International Application No. PCT/EP03/06206, having an international filing date of Jun. 11, 2003 and claiming priority to European Patent Application No. 02388043.8, filed Jul. 1, 2002 and U.S. Provisional Application No. 60/393,905 filed Jul. 3, 2002, the disclosures of which are incorporated herein by reference in their entireties. The above PCT International Application was published in the English language and has International Publication No. WO 04/003721.

TECHNICAL FIELD OF THE INVENTION

The invention relates to a method of entering text into an electronic device by means of a keypad having a number of keys, each key representing a plurality of characters, the method comprising the step of entering characters by means of the keys representing said characters, wherein a character is selected among the plurality of characters represented by the corresponding key by pressing it a number of times corresponding to the character. The invention further relates to an electronic device having the possibility of entering text into the device.

DESCRIPTION OF RELATED ART

Electronic devices, such as mobile telephones and Personal Digital Assistants (PDA's), often utilize a numeric keypad for entering numeric information, such as telephone numbers or time information, into these devices. However, there is typically also a need to enter text information into such devices. Examples are names, addresses and messages to be sent to other similar devices. Since these devices only rarely have sufficiently large dimensions for the arrangement of a normal alphanumeric keyboard, the numeric keypad must be used also for text information. Consequently, each key corresponds to multiple different characters. As an example, the "2" key typically also corresponds to the letters A, B and C.

One well-known method of entering text information from such a keypad is the multi-tap method in which the user is allowed to iterate through the possible characters by pressing the corresponding key multiple times. To enter e.g. the letter "A", the user presses the "2" key a single time, while the key is pressed three times to enter the letter "C". The key must be pressed the multiple times relatively fast to ensure that the correct character is recognized. Alternatively, a separate key is used to iterate through the possibilities, once one of the numeric keys has been pressed.

Another method uses a predictive editor application for entering and editing text information. One such method is described in U.S. Pat. No. 6,307,548. When text is entered using predictive input, each key is only pressed once, and the display will show one of the possible character sequences corresponding to the entered key sequence, typically the one which is most commonly used in the language of the user, or by using the exact match approach. There is no time limit, so it is possible to press the keys relatively quickly after each other. If, for example, a user (using the English language) enters the key sequence "2" (ABC), "7" (PQRS) and "3" (DEF), 36 different character sequences are possible. However, only five of these (ARE, APE, CRE, BRE and ARD) are found as words or word stems in the stored vocabulary of the device. "ARE" has the highest frequency of use and it will thus be shown in the display. If this is the word the user intended to write, it can be accepted by pressing an acceptance key, which could typically be the key used for entering a space character. If it is not the correct word, the user may step through the other proposals by using a select key until the correct word is shown at the insertion point in the text, before it is accepted with the acceptance key. During character entry, i.e. as long as a word has not yet been accepted, the word is held "open", which is typically shown by underlining of the word (or character sequence) or drawing of a box around it. This illustrates that the shown word is just one of the possibilities or candidates provided by the vocabulary.

As mentioned, one candidate is presented on the display in the text message entered by the user. The other candidates may be cycled through by use of a select key, e.g. one of the arrow up/down keys. Each time a different candidate is inserted into the text on the display. To facilitate the navigation, the individual candidates may be identified by their number being shown in e.g. the corner of the display. In the above-mentioned example the word "ARE" may be identified by "⅕" showing that this is candidate number one of five candidates.

The predictive editor method works well as long as the word the user intended to write is actually found in the vocabulary of the device. If the word is not found the only possibility left to the user is to somehow switch to the multi-tap method and then re-enter the exact characters to get the word correctly. This switch from one type of text entry to another can be made in different ways. One possibility is to let a new window pop up on the display of the device informing the user that the word was not found and allowing him to enter the exact character sequence for the intended word only. When the word is completed it will be inserted into the text being entered, and the focus of the user is returned to the predictive editor mode. Alternatively, the user may have to press a specific key sequence or select from a menu in order to change between the two different input modes. No matter how the mode switch is performed it will also be a major switch in mindset for the user since the two modes are so different.

Since many users tend to use many special words/character combinations, such as names, slang or so-called emoticons (emotional icons), which are not found in the standard vocabularies, it will often be necessary to shift between the two modes several times during the entering of even a single message. Some vocabularies are dynamic, which means they may be dynamically updated with new words when they occur in a text so that these words only have to entered by using multi-tap the first time they occur. This reduces the number of switches between the two modes, but still it is necessary to switch mode quite often.

Having to switch between the mindsets of the very different input methods repeatedly during text input takes the focus of the user away from typing, thus making it unnecessarily hard to write such messages. Nevertheless, both modes are needed. Many users prefer predictive input since it is a faster way of entering text in may cases, but as mentioned, it is insufficient for words that are not found in the vocabulary of the device, and therefore, multi-tap is needed to enter such words. However, predictive input has a steep learning curve, and therefore, a large number of people tend to stick with multi-tap, especially if they often write texts including words not found in available vocabularies, thus totally avoiding predictive input and its associated benefits.

Therefore, it is an object of the invention to provide a way of entering text by means of keys representing a plurality of characters, in which a user can obtain at least some of the benefits of predictive text input without having to switch to a different mode to enter words which are not found in the vocabulary of the device.

SUMMARY

According to the invention the object is achieved in that the method further comprises the steps of attaching to each key, in addition to the plurality of characters represented by that key, a further, ambiguous character representing any one of the plurality of characters represented by the key; activating a sequence of keys such that an ambiguous character sequence comprising at least one ambiguous character is generated; generating possible non-ambiguous character sequences corresponding to said ambiguous character sequence; comparing said possible character sequences with a vocabulary stored in a memory, said vocabulary comprising character sequences representing words occurring in a given language; pre-selecting those of said possible character sequences that match character sequences stored in said vocabulary; selecting one of said pre-selected character sequences; and entering the selected character sequence into the device.

By using the basic characteristics of the multi-tap method and then adding the possibility of a "wildcard" character, i.e. a character which can be any one of the characters represented by a given key, and facilities allowing prediction of character sequences including such "wildcard" characters, a text input mode is achieved which combines the benefits of the two different known input modes in such a way that there is no longer any need to switch to another mode. This mode handles words in the vocabulary as well as words, which are not found in the vocabulary.

Further, since this method is very similar to the multi-tap method in use, it is more likely that users which are reluctant to learn the known predictive editor method will use this method and thus be able to benefit from the predictive possibilities of the vocabulary in the device. Another benefit is that word completion, which until now has only been available with the predictive editor method, will now also be available for the users which are reluctant to learn the known predictive editor method.

The method can be used alone, or it can be combined with the well-known multi-tap and/or predictive methods. As an example, a user may start entering characters using the normal predictive input method, and, if the entered character string does not match any word or word stem in the stored vocabulary, the device may automatically switch to the method described here.

When the method further comprises the step of selecting the further, ambiguous character attached to a given key by pressing said given key a single time, the use of the prediction facilities is made easier, because the ambiguous or "wildcard" character is selected as the first one for each key, while the selection of a specific one of the characters represented by the key requires further activation of the key.

When the method further comprises the step of presenting, when a key has been pressed at least one time, a list of the plurality of characters represented by the pressed key on said display, it is easier to control that the intended character is selected.

When the method further comprises the step of presenting the further, ambiguous character attached to a given key as the first character in said list, it is easier to select this character as the first one when a key is pressed.

When the method further comprises the step of presenting the further, ambiguous character attached to a given key as an asterisk in said list, it is clearly illustrated that this character is the ambiguous or "wildcard" character used for prediction. However, other symbols can also be used for this purpose.

As mentioned, the invention further relates to an electronic device, such as a mobile telephone or a Personal Digital Assistants (PDA), having the possibility of entering text into the device, and comprising a keypad with a number of keys, each key representing a plurality of characters, wherein a given character can be entered by pressing the key representing said given character a number of times corresponding to the character. When each key is arranged to represent, in addition to the plurality of characters represented by that key, a further, ambiguous character representing any one of the plurality of characters represented by that key, the device further comprising a memory, wherein a vocabulary comprising character sequences representing words occurring in a given language is stored; means for generating possible non-ambiguous character sequences corresponding to an ambiguous character sequence comprising at least one ambiguous character and generated by a sequence of activated keys; and means for comparing said possible character sequences with said stored vocabulary and pre-selecting possible character sequences matching character sequences stored in the vocabulary; and the device further being arranged to allow a user to select one of said pre-selected character sequences and enter the selected character sequence into the device, a way of entering text by means of keys representing a plurality of characters is achieved, in which a user can obtain at least some of the benefits of predictive text input without having to switch to a different mode to enter words which are not found in the vocabulary of the device.

When the device is further arranged to select the further, ambiguous character represented by a given key by pressing said given key a single time, the use of the prediction facilities is made easier, because the ambiguous or "wildcard" character is selected as the first one for each key, while the selection of a specific one of the characters represented by the key requires further activation of the key.

When the device is further arranged to present, when a key has been pressed at least one time, a list of the plurality of characters represented by the pressed key on a display, it is easier to control that the intended character is selected.

When the device is further arranged to present the further, ambiguous character represented by a given key as the first character in said list, it is easier to select this character as the first one when a key is pressed.

When the device is further arranged to present the further, ambiguous character represented by a given key as an asterisk in said list, it is clearly illustrated that this character is the ambiguous or "wildcard" character used for prediction. However, other symbols can also be used for this purpose.

BRIEF DESCRIPTION OF THE DRAWINGS

The invention will now be described more fully below with reference to the drawings, in which.

DETAILED DESCRIPTION OF EMBODIMENTS

Figure 1:
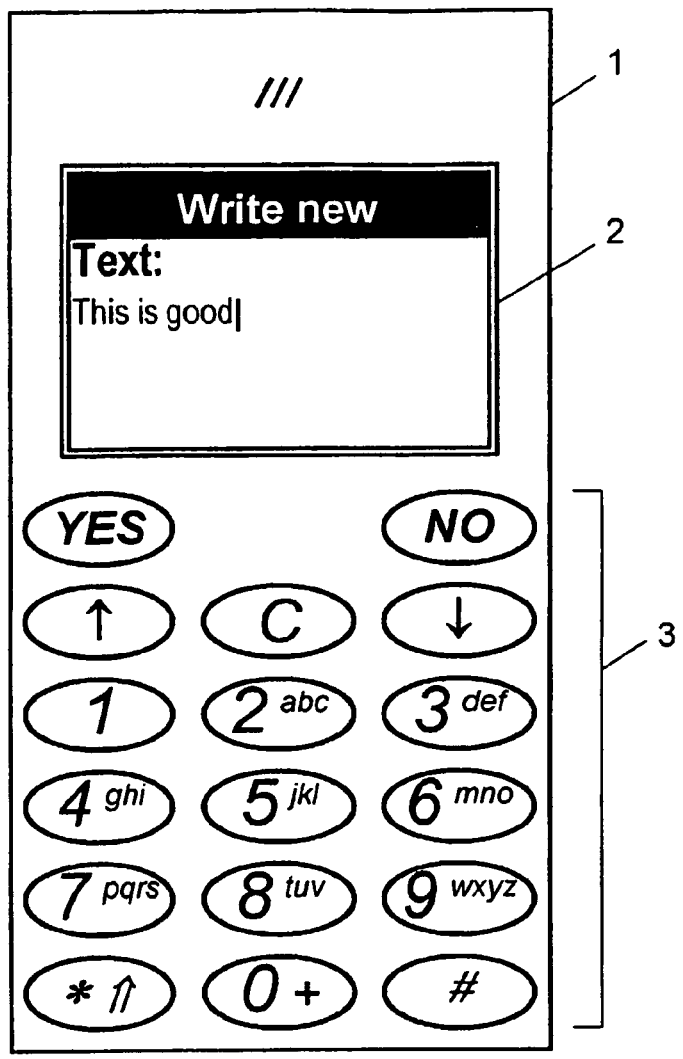
FIG. 1 shows a mobile telephone in which the invention may be used.

FIG. 1 shows an example of a device in which the invention can be used. The shown device is a mobile telephone 1, e.g. a GSM telephone and/or a UMTS telephone. Other types of telephones are CDMA, PDC, CDMA 2000 and TDMA. However, it should be noted that the invention could be used in other types of devices also. As examples, PDA's (Personal Digital Assistant), computers and set-top-boxes for television sets may be mentioned.

The telephone 1 is equipped with a display 2 and a keypad 3. The keys of the keypad 3 are used for entering information into the telephone. This information may be of many various types, such as telephone numbers, address information, instructions to the telephone and text messages to be sent to another telephone. The display 2 is used for presentation of information to the user of the mobile telephone. Also the presented information may be of various types, such as telephone numbers, address information, indications from the telephone, text messages received from another telephone, or text messages entered by the keypad 3 for later transmission to another telephone. In FIG. 1 a part of a text message has been entered from the keypad 3, and the entered text is now shown on the display 2. This is a situation in which the invention can be utilized.

Figure 2:
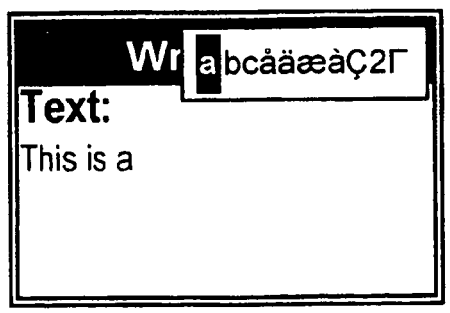
FIGS. 2 and 3 show examples of the display when entering characters by using a known multi-tap method.

As shown, the keypad 3 is a numeric keypad having only a limited number of keys. Thus each key corresponds to multiple different characters when the keypad is used for entering text information. As an example the "3" key also corresponds to the letters D, E and F. One way of entering text information from such a keypad is the multi-tap method in which the user is allowed to iterate through the possible characters by pressing the corresponding key multiple times. To enter e.g. the letter "a", the user presses the "2" key a single time. This is illustrated in FIG. 2, which shows the display 2 when the user has entered the words "This is" and then just pressed or tapped the "2" key once. The letter "a" is shown after the already entered text, and further a box or a window in the upper right corner of the display 2 indicates all the characters that are associated with this key. As seen, a number of special characters may be associated with the key in addition to the letters a, b and c, although it is of course also possible to limit the possibilities to the three letters. Since the key was pressed only once, the letter "a" is highlighted to indicate that this is the letter inserted in the text.

Figure 3:
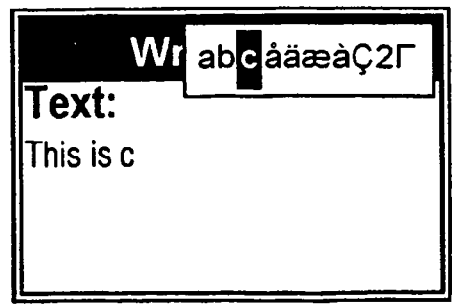

To enter the letter "c" the key is pressed three times after each other. FIG. 3 shows the display 2 in this situation. The letter "c" is shown after the already entered text, and the window in the upper right corner shows the letter "c" highlighted. The key must be pressed multiple times relatively fast to ensure that the correct character is recognized. After a time-out the character will be accepted, i.e. inserted into the text, and the window in the upper right corner will disappear. The device is now ready for the next character to be entered. Pressing a different key before the time-out has expired cancels the time-out, thus speeding up the typing process.

Another way of entering text information from such a keypad is the use of a predictive editor, which is an intelligent software protocol capable of suggesting possible character sequences corresponding to a given key sequence entered by the user. One such well-known predictive editor is named T9™ (registered trademark owned by Tegic Communications, Inc.), which is commercially available and well described in the art. Another one is eZiText™ (registered trademark owned by Zi Corporation). Thus the function of the predictive editor will only be described very briefly with reference to FIG. 4.

Figure 4:
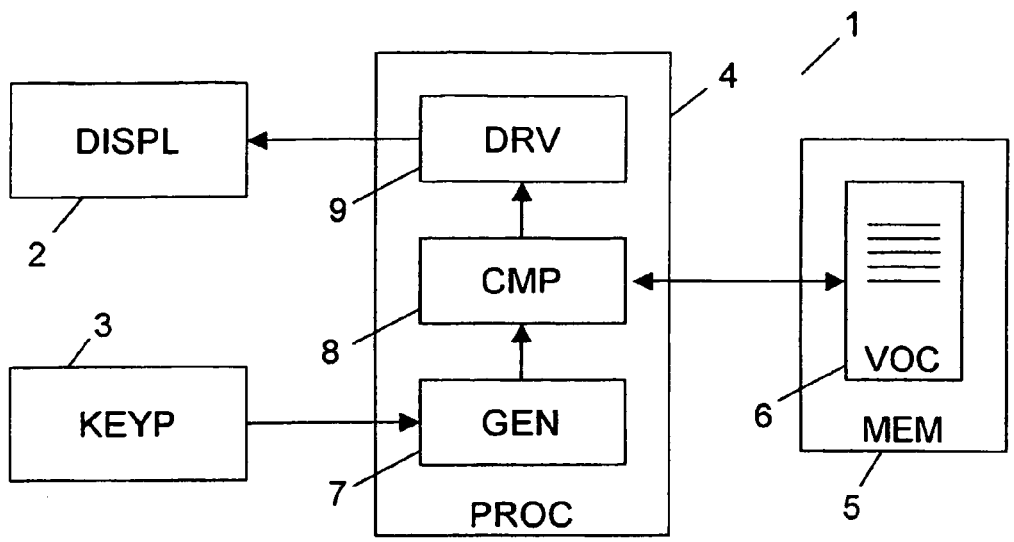
FIG. 4 shows a block diagram of the telephone in FIG. 1.

As illustrated in FIG. 4, the telephone 2 also includes a processor 4 and a memory 5. In the memory 5 a vocabulary 6 is stored which comprises a list of allowable character sequences for a given language, i.e. character sequences which form words or word stems in that language. Of course a device may have several different vocabularies corresponding to different languages stored in the memory. Here each key is only pressed once, independent of which of the associated characters the user intends to enter. When a user enters a key sequence from the keypad 3 the possible corresponding character sequences are generated in the unit 7 in the processor 4. If, for instance, the user (using the English language) enters the key sequence "4" (GHI), "6" (MNO), "6" (MNO) and "3" (DEF), 81 different character sequences are possible. These are now compared (in the comparing unit 8) to the vocabulary 6, and it is found that only 12 of the 81 possible character sequences are stored in the vocabulary 6 as English words or word stems. Thus these 12 character sequences are now selected as candidates for presentation to the user, and the driver 9 presents them on the display 2. Often the vocabulary 6 also contains information of the frequency of use for each character sequence in the relevant language, and in that case the selected sequences may further be ranked according to their use, so that the most commonly used character sequence is presented at the top of the list. In this case "good" is the most commonly used word among the 12 selected character sequences, and it is thus presented to the user as the first suggestion.

Figure 5:
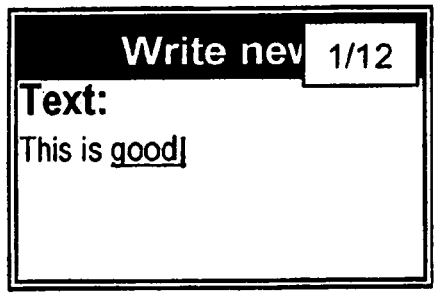
FIGS. 5 to 7 show examples of the display of a known predictive editor.

The presentation to the user is illustrated in FIG. 5, in which the user has entered the words "This is" followed by the above sequence. Since "good" is the first of the suggestions, it is shown on the display. It is shown that "good" is underlined to indicate that this word is still open, i.e. it may still be changed to another one of the selected possibilities. Further, it is indicated in the upper right corner of the display that this suggestion is the first of the 12 possibilities by showing "1/12" in a box. If this is the word the user intended to enter, it can be accepted by e.g. entering a space character. The acceptance is shown by moving the cursor to the next position, and "good" will no longer be underlined.

Figure 6:
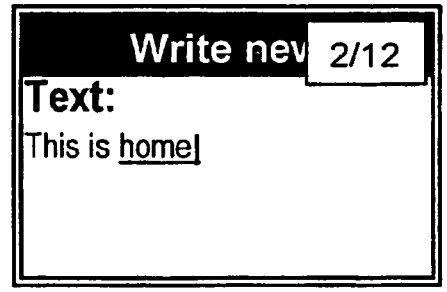
Figure 7:
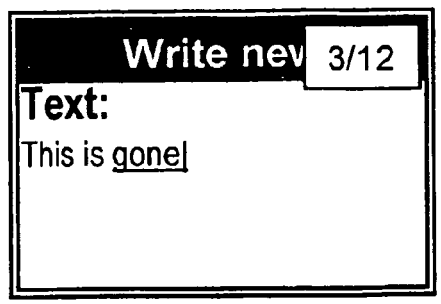

If, however, it is not the intended word, the user can move to the next one on the list by means of e.g. an "arrow down" key. As shown in FIG. 6, the system then suggests "home" and indicates "2/12" in the upper corner. In FIG. 7 this step has been repeated, and the system suggests "gone". When the intended word is shown, it can be accepted as described above, and the user can continue with the next word. The mentioned key sequence might also be the beginning of a longer key sequence, and in that case the user will continue by pressing further keys and then let the system suggest corresponding words or word stems.

It may also be possible to go back to an earlier entered word and "re-open" it to switch to another candidate or to continue typing to achieve a longer word. In some systems there are also options to extend the vocabulary search to obtain "word completion". In this case a candidate longer than the number of key entries can be shown, and often this word is inserted in the vocabulary by the user.

As mentioned earlier, the predictive editor method will typically be the faster of the two methods of entering text information, but it has a steep learning curve, and it cannot handle words that are not found in the vocabulary of the device. Therefore, it will often be necessary to switch to the multi-tap method to enter such a word.

Thus, if the word is not found, the only possibility left to the user is to somehow switch to the multi-tap method and then re-enter the exact characters to get the word correctly. This switch from one type of text entry to another can be made in different ways. One possibility is to let a new window pop up on the display of the device informing the user that the word was not found and allowing him to enter the exact character sequence for the intended word only. When the word is completed it will be inserted into the text being entered, and the focus of the user is returned to the predictive editor mode. Alternatively, the user may have to press a specific key sequence or select from a menu in order to change between the two different input modes. No matter how the mode switch is performed it will also be a major switch in mindset for the user since the two modes are so different.

According to the invention a different way of entering text information from a numeric keypad is suggested which combines the benefits of the two ways described above, i.e. the multi-tap method and the predictive editor method. The new method eliminates the need to change between the two other methods.

Characters are entered in the same way as in the well-known multi-tap method, i.e. each key represents a number of different characters, and the intended one is selected by pressing the key a specific number of times. However, a further character is now attached to each key. This further attached character is an ambiguous character, which may represent any one of the other characters represented by that key. It may also be called a wildcard character and it is similar to the ambiguous characters entered in the predictive editor method described above. Here, however, it is just one of the possibilities that can be selected with a specific key. Expediently, this ambiguous character is arranged as the first character to be selected by a key, so that it can be selected by pressing the key a single time, while the specific characters represented by that key are selected by pressing the key multiple times.

Figure 8:
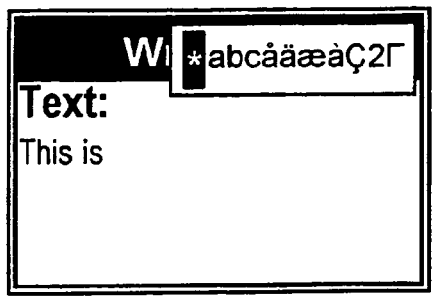
FIGS. 8 to 9 show examples of the display when entering a character by using the method according to the invention.
Figure 9:
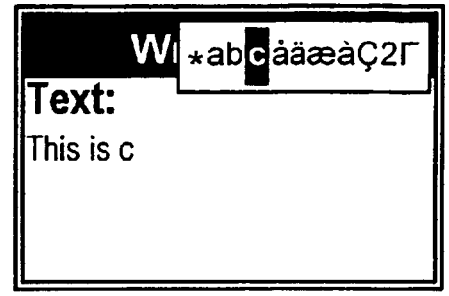

Similarly to the normal multi-tap method a box or a window indicating the characters associated with a key can be shown on the display when the key has been pressed. This is illustrated in FIG. 8 in which the "2" key has been pressed once. The ambiguous or wildcard character is here shown as an asterisk (*) and it is highlighted to indicate that this is the character that will be inserted into the text if the key is not pressed again before the timeout. If the "2" key had been pressed e.g. four times sufficiently quickly after each other to avoid the timeout, the letter "c" will be highlighted and this specific letter will be the one inserted into the text. This is illustrated in FIG. 9. Thus the difference from the normal multi-tap method is that the first multi-tap choice will be the wildcard associated with that key instead of the usual first multi-tap character. If a wildcard character is not wanted, it is just to continue tapping and directly enter a non-wildcard character. The specific character highlighted may also be shown after the already entered text as described for the classic multi-tap method above, which is illustrated by the letter "c" in FIG. 9. When selecting the wildcard character it will typically be more convenient not to insert the character after the previous text until the character has been accepted, i.e. the multi-tap timeout has expired and the window indicating the possibilities has disappeared.

If a user wishes to utilize the predictive function, each key is only pressed once, and an ambiguous character sequence is entered similarly to the normal predictive editor method described above, after which the predictive editor suggests possible character sequences. The only difference from the well-known predictive editor method that is directly seen by the user is the need to wait for the multi-tap timeout, so that the entered character is accepted, before the next character can be entered again using the same key. This may be considered as a drawback for users writing very fast, but the problem is shared with the classic multi-tap method as described above. Also the other characteristics of the classic predictive editor method can be used here, e.g. the box indicating that a character sequence suggested by the editor is e.g. the first of 12 options.

Figure 10:
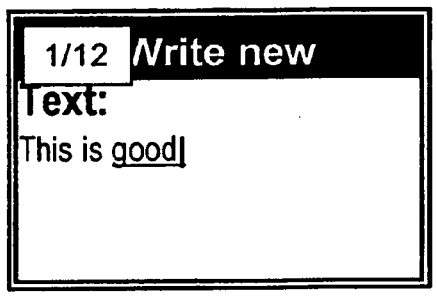
FIGS. 10 to 12 show examples of the display when entering a key sequence by using the method according to the invention.
Figure 11:
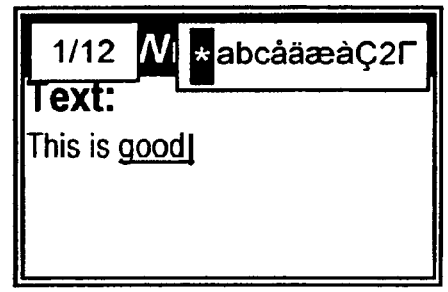
Figure 12:
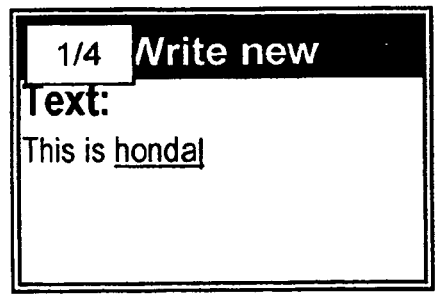

Thus, for instance, if the user (using the English language) has entered the key sequence "4" (GHI), "6" (MNO), "6" (MNO) and "3" (DEF) after the earlier entered text "This is", the word "good" will be shown on the display because this word is the one suggested first by the editor, and the window will show "1/12" to indicate that "good" is the first of 12 suggestions. This is shown in FIG. 10, which is similar to FIG. 5 except that the window is shown in the upper left corner instead of the upper right corner. If the user then presses the "2" key a single time the display can be as shown in FIG. 11, where "good" and "1/12" still refers to the first four keystrokes, while the window in the upper right corner indicates that the "2" key has been pressed once and the multi-tap timeout has not yet expired. If the user continues to press the key again one or more times, one of the specific characters represented by that key can be selected. Otherwise, a fifth wildcard character will be accepted, and as shown in FIG. 12, the editor will now suggest "honda" as the first of four possibilities. The other three suggestions are "goodb", "immea" and "homec". If the user actually intended to write "homebound", which is a word not found in the vocabulary of the device, he could now just go one step backwards to the situation in FIG. 10, e.g. by pressing the "C" key, select "home" as the wanted word stem, and then continue multi-tapping the remaining specific characters. There is no change of mode.

One of the benefits of the new method is that wildcard characters and specific characters can be used between each other in an open word, and in this way a search in the predictive vocabulary can be narrowed. As an example, the string "h <ghi>" (in which <ghi> indicates the wildcard character for the "4" key) can be entered instead of the string "<ghi> <ghi>". The first string will only match words starting with the character "h", and thus the number of matching candidates will be limited compared to the second string comprising also words starting with the characters "g" and "i".

In FIGS. 8, 9 and 11 the wildcard character is shown as an asterisk (*) in the window showing the possibilities for a given key. This symbol is only an example and other symbols can be used as well to indicate the wildcard character. However, it should preferably be indicated as the first possibility for each key in order to speed up typing when the predictive function is used. The asterisk is used to indicate the wildcard character in the window showing the options, but as shown above, it does not show up as an asterisk in the text. Instead the suggested word is shown as if the wildcard character had been typed in using classic predictive input.

The suggested method may also help users getting used to the predictive editor. As mentioned before, the well-known predictive editor method has a steep learning curve, and therefore many people stick to multi-tap today, which means that they have no benefit at all from the vocabulary support provided by this method. This is true for traditional vocabularies/dictionaries as well for user dynamic vocabularies, i.e. vocabularies which are updated with new words entered by the user. Thus it could be advantageous to make some of the benefits available also for multi-tap. A first step could be pure word completion in which the editor suggests longer words starting with the specific characters entered by the user by multi-tap. This is similar to what is known from entering URLs in an Internet browser, where explicit characters are entered (although they are not multi-tapped on a normal computer), and very soon the program will suggest a number of matching addresses starting with the entered characters. If the intended address is among the suggestions it can be selected directly. As an example, word completion is very useful when entering a name to be looked up in a phone book stored in the device. When the user has taken the step from pure multi-tap to completion supported multi-tap, it is not far to the next step, which could be in the form of the method described here, and then to true predictive input.

The described text entry system is very well suited for tasks with a certain amount of special words, which are not found in normal vocabularies. Examples could be names (and similar data stored/added to e.g. a phone book), emoticons (emotional icons/character combinations (such as ":-)" or ☺) known as smileys, etc.), slang (e.g. combinations of symbols, digits and characters in normal SMS/Chat texts), etc. All these share a dynamic nature, which is hard to catch in a normal dictionary within a useful time window, unless the user does the job of entering the words or the system picks them up for re-use on an individual user basis. If the user does not enter words explicitly into a user dictionary it can be done automatically by processing incoming and outgoing texts. Another possibility could be dictionary downloading/update over the air. The system is also well suited for entering URLs.

An advantage of the described input method combining the benefits of multi-tap and predictive editor is that the user always has a valid word stem going. There is no reason for putting up a sign saying "word not in dictionary" and having to retype the word using multi-tap. When there are no more candidates or completions multi-tap will continue the single word stem to where the user takes it.

One common use case in pure predictive mode is that the dictionary contains the beginning of the word you want, but not any good endings. Thus the user has predictively come so far that he sees the beginning of the word as a candidate, but when continuing he fails. A "back space" brings him back to the stem/beginning he wants and then the task is to finish the word. Until now this could be done by switching to "edit word" and then pure multi-tap it. Being in hybrid mode described here from the start he would instead just start multi-tapping the explicit characters.

Another use case is that a user wants to enter "CUL8R" (slang for "see you later") or some other slang not in dictionary. Start entering it explicitly. If lucky it wasn't the first time and it will complete, otherwise you will still have it the first try.

Yet another use case is that a user wants to call someone from the internal phone book in which there are very many entries. Earlier it has only been possible to use multi-tap in relation to the internal phone book. From the beginning the user will see all names starting with "a". It is known that the name starts with an "s" and that there are very many entries with "pqrs". Thus start with an explicit, multi-tapped "s". (If you on the hand know the opposite, start with a predictive key press to get approximately right in place.) After this there are many ways to continue. If you see the candidate (completed), select it and be done. If many names start with the same correct stem, hybrid predict them by the method described here (saving key presses) to forward to a character position that will make a difference (the alternative is pure multi-tap ahead or multi-tap combined with word completion). In this use case it would be very beneficial to have a way to accept a part of a candidate to continue with a decisive character, like the second name (surname) if many share the same birth name.

For users that have accepted the true predictive paradigm, the method described here or pure multi-tap might seem a lesser way of input. The truth is that many have not come that far and continue with pure multi-tap either for the reason of not knowing better or for finding multi-tap to be superior for the task at hand. Hybrid text input as described here can be a step on the way towards pure predictive or a means for more powerful multi-tap.

As mentioned, one of the advantages of this method is that there is no need for the user switch between different modes during the entering of characters. However, if it is preferred by the user, the method may well be combined with the two well known methods, i.e. multi-tap and the normal predictive editor method. Thus, if a user experienced with the normal predictive editor method finds the need to wait for the multi-tap timeout being a drawback because he is able to write very fast, it would be expedient to start a word with the normal predictive editor method. When an entered character string no longer matches any entries in the vocabulary, the device can automatically switch to the method described here, and the word can be continued. This is not a major switch in mind set because the two methods are not so far from each other. Earlier, the user would have to switch to normal multi-tap in order to continue a word that was not found in the vocabulary. It would also be possible to start a word with the method described here and then switch to normal multi-tap combined with word completion as in the phone book example described above.

As mentioned above, it is expedient to arrange the ambiguous character as the first character to be selected by a key, and thus also to show this character as the first one in the window (on the display) indicating the characters associated with a key. However, it is also possible to arrange the characters associated with a key in any other order. Thus, as an example, the characters associated with the "2" key may also be arranged in the order "a", "b", "c", "*" followed by the other special characters associated with this key.

Although a preferred embodiment of the present invention has been described and shown, the invention is not restricted to it, but may also be embodied in other ways within the scope of the subject-matter defined in the following claims.

The invention claimed is:

1. A method of entering text into an electronic device by means of a keypad having a number of keys, each key representing a plurality of characters, the method comprising:
   entering characters by means of the keys representing the characters, wherein a character is selected among the plurality of characters represented by the corresponding key by pressing the key a number of times corresponding to the character,
   attaching to each key, in addition to the plurality of characters represented by that key, a further, ambiguous character representing any one of the plurality of characters represented by the key, wherein the plurality of characters and the ambiguous character are concurrently assigned to each key for selection by pressing the key a number of times corresponding to either the ambiguous character or the plurality of characters;
   activating a sequence of keys such that an ambiguous character sequence comprising at least one ambiguous character is generated;
   generating possible non-ambiguous character sequences corresponding to the ambiguous character sequence;
   comparing the possible character sequences with a vocabulary stored in a memory, the vocabulary comprising character sequences representing words occurring in a given language;
   pre-selecting ones of the possible character sequences that match character sequences stored in the vocabulary;
   selecting one of the pre-selected character sequences; and
   entering the selected character sequence into the device.

2. A method according to claim 1, further comprising selecting the further, ambiguous character attached to a given key by pressing the given key a single time.

3. A method according to claim 1, further comprising presenting, when a key has been pressed at least one time, a list of the plurality of characters represented by the pressed key on a display.

4. A method according to claim 3, further comprising presenting the further, ambiguous character attached to a given key as the first character in the list.

5. A method according to claim 3, further comprising presenting the further, ambiguous character attached to a given key as an asterisk in the list.

6. An electronic device configured such that text can be entered into the device, the device comprising:
   a keypad with a plurality of keys, each key representing a plurality of characters, wherein a given character can be entered by pressing the key representing the given character a number of times corresponding to the character, each key being arranged to represent, in addition to the plurality of characters represented by that key, a further, ambiguous character representing any one of the plurality of characters represented by that key, wherein the plurality of characters and the ambiguous character are concurrently assigned to each key for selection by pressing the key a number of times corresponding to either the ambiguous character or the plurality of characters;
   a memory, configured to store a vocabulary comprising character sequences representing words occurring in a given language;
   means for generating possible non-ambiguous character sequences corresponding to an ambiguous character sequence comprising at least one ambiguous character and generated by a sequence of activated keys; and
   means for comparing the possible character sequences with the stored vocabulary and pre-selecting possible character sequences matching character sequences stored in the vocabulary; and
   the device being arranged to allow a user to select one of the pre-selected character sequences and enter the selected character sequence into the device.

7. An electronic communications device according to claim 6, wherein the device is further arranged to select the further, ambiguous character represented by a given key by pressing the given key a single time.

8. An electronic communications device according to claim 6, wherein the device is further arranged to present, when a key has been pressed at least one time, a list of the plurality of characters represented by the pressed key on a display.

9. An electronic communications device according to claim 8, wherein the device is further arranged to present the further, ambiguous character represented by a given key as the first character in the list.

10. An electronic communications device according to claim 8, wherein the device is further arranged to present the further, ambiguous character represented by a given key as an asterisk in the list.

* * * * *